United States Patent
Adams et al.

(10) Patent No.: US 6,416,057 B1
(45) Date of Patent: Jul. 9, 2002

(54) BRUSH SEAL

(75) Inventors: William V. Adams, Scotts; Christopher D. McCowey, Portage; Leroy A. Waling, Kalamazoo; Antonio F. Artiles, Portage, all of MI (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 09/549,460

(22) Filed: Apr. 14, 2000

Related U.S. Application Data

(60) Provisional application No. 60/129,777, filed on Apr. 16, 1999, and provisional application No. 60/129,601, filed on Apr. 16, 1999.

(51) Int. Cl.[7] ............................. F16J 15/34
(52) U.S. Cl. ................ 277/355; 277/352; 277/361; 277/362; 277/396
(58) Field of Search ................. 277/355, 352, 277/361, 362, 371, 374, 375, 396, 346, 347, 348

(56) References Cited

U.S. PATENT DOCUMENTS

| | | | |
|---|---|---|---|
| 885,032 A * | 4/1908 | De Ferranti | |
| 2,365,046 A | 12/1944 | Bottomley | |
| 2,498,739 A | 2/1950 | Magnesen | |
| 2,871,041 A | 1/1959 | Anderton | |
| 3,529,839 A | 9/1970 | Greiner et al. | |
| 3,655,206 A | 4/1972 | Adams | |
| 4,265,455 A | 5/1981 | Lundgren | |
| 4,403,779 A | 9/1983 | Wilkinson | |
| 4,486,026 A | 12/1984 | Furumura et al. | |
| 4,696,480 A | 9/1987 | Jörnhagen | |
| 4,756,536 A * | 7/1988 | Belcher | 277/53 |
| 4,924,817 A * | 5/1990 | Seelen | 122/379 |
| 5,026,252 A | 6/1991 | Hoffelner | |
| 5,106,104 A | 4/1992 | Atkinson et al. | |
| 5,135,237 A | 8/1992 | Flower | |
| 5,143,384 A | 9/1992 | Lipschitz | |
| 5,318,309 A | 6/1994 | Tseng et al. | |
| 5,351,971 A * | 10/1994 | Short | 277/53 |
| 5,474,305 A | 12/1995 | Flower | |
| 5,496,045 A | 3/1996 | Millener et al. | |
| 5,997,004 A | 12/1999 | Braun et al. | |
| 6,244,599 B1 * | 6/2001 | Braun et al. | 277/352 |
| 6,250,879 B1 * | 6/2001 | Lampes | 415/174.2 |

FOREIGN PATENT DOCUMENTS

| | | |
|---|---|---|
| SU | 651 161 | 3/1979 |
| WO | WO 86/05252 | 2/1986 |

* cited by examiner

*Primary Examiner*—Anthony Knight
*Assistant Examiner*—Matthew E. Rodgers
(74) *Attorney, Agent, or Firm*—Flynn, Thiel, Boutell & Tanis, P.C.

(57) ABSTRACT

A brush seal arrangement for sealing cooperation between a shaft and a surrounding member which is relatively rotatable with respect to the shaft. The brush seal includes an annular rotor disposed in surrounding relationship to the shaft and sealed with respect to the housing, and the rotor mounts thereon first and second annular bush members which are disposed in axially spaced relation and which have annular edge portions which create a frictional and sealing engagement with the shaft to nonrotatably and sealingly couple the rotor to the shaft. A passage extends through the rotor for communication with an annular region defined between the annular brushes in surrounding relationship to the shaft, and a pressurized buffer gas is supplied through the passage into the annular region.

7 Claims, 2 Drawing Sheets

BRUSH SEAL

This application claims benefit to Provisional Application No. 60/129601 filed Apr. 16, 1999 which claims benefit to No. 60/129777 filed Apr. 16, 1999.

FIELD OF THE INVENTION

This invention relates to improvements with respect to a brush seal used either as a primary or secondary seal for effecting a sealing relationships between a relatively rotatable shaft and a surrounding member such as a housing.

BACKGROUND OF THE INVENTION

Brush seals have been utilized in various applications to effect a seal between relatively rotatable members. In most applications the sealing contact region between the brush seal and the member are relatively rotatable, and thus brush seals have been known to cause significant wear due to the abrasive effect of the metal brush bristles where they contact the rotating member. Recently there has been proposed a hybrid brush seal involving a floating rotor unit which mounts an annular brush thereon which in turn has a sealing engagement with a rotating shaft to create a primary or secondary seal therewith, which floating rotor unit is in its entirety rotatable with the shaft due to the frictional (i.e. interference) engagement between the free ends of the brush bristles and the shaft. This floating brush seal is typically used in combination with a face seal, preferably a noncontacting face seal, thereby defining primary and secondary seals which cooperate between the rotating shaft and the surrounding member. While a seal arrangement of this latter type is believed to possess desirable properties for many types of seal applications, nevertheless such seal arrangement is subject to ongoing development to improve the properties thereof.

This invention relates to a brush seal which employs a floating brush rotor which is disposed in concentric relationship with respect to a rotating member on which it is mounted and with which it creates a sealed relation, the latter sealed relationship also creating a support for the brush rotor so that it is substantially nonrotatably carried by the rotating member, the latter typically being a rotatable shaft. The floating brush rotor is, in the preferred embodiment, utilized as part of a hybrid seal which additionally incorporates a face-type seal so that the face and brush seals permit creation of primary and secondary sealing areas between relatively rotatable members.

In one improvement, the brush seal rotor includes a pair of annular brushes disposed in axially adjacent but spaced relation on a common rotor member so that the bristles of the two brushes sealingly engage a rotatable shaft, whereby an annular region is defined axially between the brushes and radially between the rotor and shaft. A supply passage projects through the rotor for communicating with the annular region to supply same with a buffer gas which is normally at a somewhat higher pressure than the process fluid pressure which exists adjacent one side of one of the brush seals. With this arrangement the buffer gas minimizes any migration of process fluid, particularly process liquid, through the brush seal while at the same time permits only minimal migration of buffer gas through the brush seal into the process fluid. The presence of buffer gas additionally helps maintain the bristle sealing areas free from build-up of debris.

Another improvement relates to a brush seal which is preferably floatably mounted relative to its sealing and supporting member and which additionally incorporates an annular gasket carried by the brush rotor in close proximity to the brush seal on the side thereof which faces the process fluid so that the gasket, due to its cooperation between the rotor and the support member or shaft, minimizes the exposure of the brush seal to the process fluid and thus greatly minimizes leakage of process fluid through the brush seal, particularly in those instances where the process fluid is a liquid.

A further improvement is a brush seal, particularly a floating brush seal which is used in combination with a double face seal, wherein the floating brush rotor is disposed between and defines thereon opposed sealing faces which cooperate with sealing faces defined on a pair of opposed stator seal rings mounted on the surrounding housing. The face seals are preferably gas seals so as to create a thin fluid sealing film between the opposed sealing faces. A spring energized seal is disposed for cooperation between one of the stator seal rings and the surrounding housing so as to urge this stator ring toward the rotor, thereby enabling the brush rotor and stator ring to relatively axially float to compensate for dimensional changes due to significant temperature variations, to allow the brush rotor to move axially relative to the shaft, and to provide pressure balancing across the seal assembly when the gas seals are used in conjunction with a pressurized buffer gas.

Structural and operational advantages of the seal arrangements disclosed herein will be apparent upon reading the following specification and inspecting the accompanying drawings.

DETAILED DESCRIPTION

Figure 1:
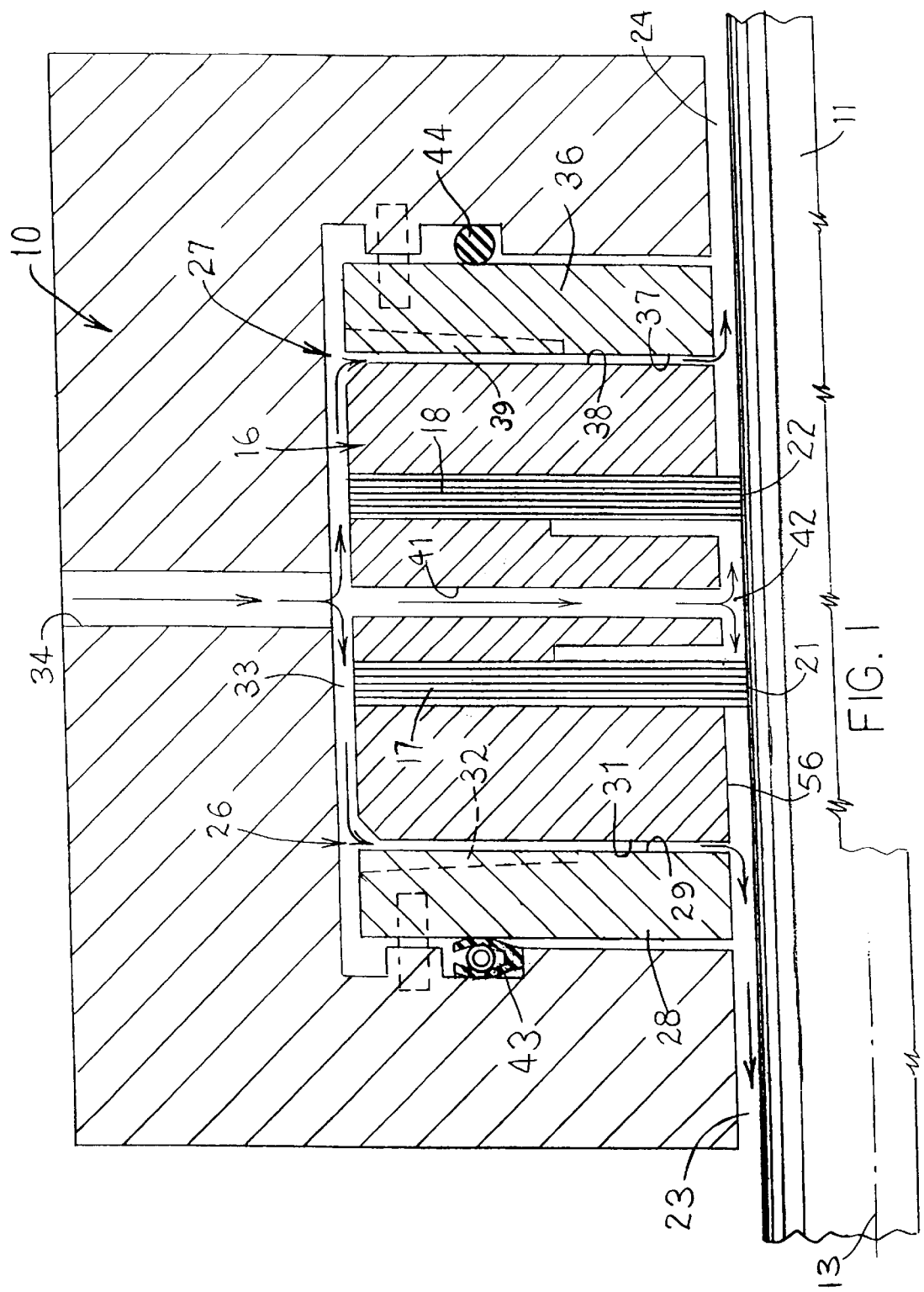
FIG. 1 is a fragmentary central cross sectional view illustrating a hybrid type seal employing a floating brush seal and a face seal for creating a sealing relationship between a relatively rotatable shaft and housing.

Referring to FIG. 1, there is illustrated an annular seal arrangement 10 which is disposed generally in concentric and surrounding relationship to the shaft 11, the latter being supported with respect to a surrounding member 12, such as a housing. The shaft 11 is typically associated with a fluid processing device such as a compressor or pump, and thus typically is the rotating member and is rotatable about its longitudinal axis 13.

A floatable seal unit 16 which functions substantially as a rotor is disposed for surrounding and supportive sealing engagement with the shaft 11. The rotor 16 mounts thereon first and second annular sealing brushes 17 and 18 which are disposed in axially spaced relation, with each brush being defined by a plurality of conventional metal brush bristles which are fixed to and carried by the rotor and project radially inwardly so as to terminate at radially inner free ends, with the plurality of bristles associated with each brush being disposed generally in an annular array which surrounds the shaft. The inner free ends of the bristles defining the brushes 17 and 18 create annular seal contact areas 21 and 22, respectively, where they engage the shaft 11. The inner ends of the brush bristles preferably have frictional or interference-type contact with the shaft 11 so that they create a sufficient gripping engagement with the shaft as to normally supportingly couple the rotor 16 to the shaft 11 for rotation therewith while creating a seal between the rotor and shaft. The seal areas 21 and 22 function to separate the chamber 23 containing pressurized process fluid from the chamber 24 which is typically at atmospheric pressure.

The overall seal arrangement 10 also includes opposed face seals 26 and 27 which cooperate between the housing 10 and the rotor 16 to define additional fluid seals between the shaft and housing.

The face seal 26 includes an annular seal member (i.e., stator) 28 which is nonrotatably secured to the housing, such as by an axially extending securing pin (shown in dotted lines) extending therebetween. This stator 28 defines an axially oriented flat seal face 29 thereon which is disposed in opposing relationship to a further flat seal face 31 formed on the adjacent axial end of the rotor 16. One of the seal faces 29 and 31, such as the seal face 29 in the illustrated embodiment, may also be provided with conventional grooves 32 formed therein to facilitate the formation of a gas film seal between the faces 29 and 31 which, during normal operation, is effective for maintaining the faces 29 and 31 in noncontacting relationship while creating a thin fluid film seal therebetween which prevents outward escape of process fluid from the chamber 23.

The radial outer edge of the face seal 26 communicates with a surrounding intermediate annular chamber 33, and the latter in turn connects with a supply port 34 which extends through the housing for connection to a source (not shown) for supplying a pressurized buffer gas (typically air or nitrogen) to the intermediate chamber 33. The buffer gas is typically at a pressure which at least slightly exceeds the pressure of the process fluid in chamber 23.

The other or outboard face seal 27 is of similar construction in that it includes an annular seal member (i.e. stator) 36 which is also nonrotatably fixed with respect to the housing 12 and defines thereon a flat and generally radial seal face 37 which axially opposes a similar seal face 38 formed on the opposed end of the rotor 16. One of these seal faces, namely the seal face 37 in the illustrated embodiment, can again be provided with conventional grooves 39 thereon to facilitate formation of a gas film seal between the faces 37–38. This face seal 27 also communicates with the intermediate chamber 33 to which the pressurized buffer gas is supplied.

The rotor 16 also has one or more passages 41 extending radially inwardly from the intermediate chamber 33 for communication with an annular region 42 which is defined axially between brushes 17 and 18 and which extends radially between the shaft 11 and rotor inner wall 56. The pressured buffer gas is thus supplied to the region 42 to restrict leakage of process fluid through the brush bristles. If the buffer fluid pressure exceed process fluid pressure, then small quantities of buffer gas may migrate through the brush, but any such migration is believed minimal.

The back face of the stator 28 is preferably sealingly engaged with the housing 12 by means of a conventional elastomeric seal 43, and the other stator 36 similarly preferably has its back face sealingly engaged to the housing 12 by means of an elastomeric seal ring 44. The seal rings 43 and 44 can be replaced by appropriate lapped contacting surfaces between the opposed stator and housing, if desired, such being conventional and well known.

Further, the seal ring 43 associated with the stator 28 is preferably constructed as a spring-energized seal, such as by comprising an annular spring of channel cross section surrounding by an elastomer so as to possess both resilient sealing properties and axial resilience. Such spring-energized seal rings are known. The use of a spring energized seal ring 43, however, is desirable for use in conjunction with the seal arrangement 10 inasmuch as the spring energized seal ring 43 provides and permits limited axial floating movement of the nonrotatable stator 28 which, in conjunction with the permissible axial floating movement of the rotor 16 relative to the stators 28 and 36, thus enables sufficient overall axial floating movement in the seal arrangement as to provide for and maintain desired small clearances at the face seals 26 and 27 so as to permit overall desired pressure balance axially of the seal arrangement, while at the same time permitting both axial movement between the rotor and shaft and additionally permitting sufficient axial movement throughout the seal assembly so as to compensate for significant temperature variations and/ or axial movement of the shaft.

With the seal arrangement illustrated by FIG. 1, during rotation of the shaft 11 the interference frictional engagement created by the seal brushes 17 and 18 at the seal areas 21, 22 permits the entire rotor 16 to be supported on and carried with the shaft 11 for rotation therewith, and thus the seal areas 21 and 22 not only create a seal which minimizes or prevents the process fluid from escaping to the atmosphere, but the generally stationary relationship which exists between the brush rotor 16 and the shaft 11 thus greatly minimizes the wear which typically occurs at the brush seal contact zone. At the same time the buffer gas supplied from chamber 33 to the face seals 26 and 27, and the relative rotation between the rotor and stator of the two face seals, is effective for creating a thin gas sealing film between the face seals sufficient to maintain the face seals in a noncontacting relationship, while at the same time preventing the outward escape of process fluid past the face seals. The details of the gas face seals and the mode of operation thereof is generally conventional, so that further detailed description thereof is believed unnecessary.

With the arrangement illustrated by FIG. 1, a highly small and compact rotor containing thereon a double brush seal can be accomplished since the double annular brushes are effectively carried on a one-piece rotor member which also desirably defines thereon, at opposite ends, the faces associated with inboard and outboard face seals.

While FIG. 1 illustrates the improved brush seal rotor used in conjunction with a hybrid seal which incorporates inboard and outboard gas seals, it will be appreciated that the improved brush seal rotor of FIG. 1 can also be desirably used by itself without cooperating face seals. In such instance the overall relationship illustrated by FIG. 1 would be maintained except that opposite end faces of the rotor 16 would be positioned for supportive sealed engagement with opposed faces on the housing. For example, the end face 38 of rotor 16 would be positioned for sealing engagement with the elastomeric seal ring 44 on the housing, and the opposite end face 31 of the rotor would be disposed for supportive engagement with the spring-energized seal ring 43. Pressurized buffer gas would still preferably be supplied through passage 41 to annual region 42 so as to provide the desired effect described above.

It will be further appreciated that the overall seal arrangement illustrated in FIG. 1, particularly the hybrid seal employing the spring-energized seal ring 43 so as to provide for desired balancing and axial compensating floating movement of both the stator 28 and brush rotor 16, can be utilized without supplying pressurized buffer gas to the annular region 42.

Figure 2:
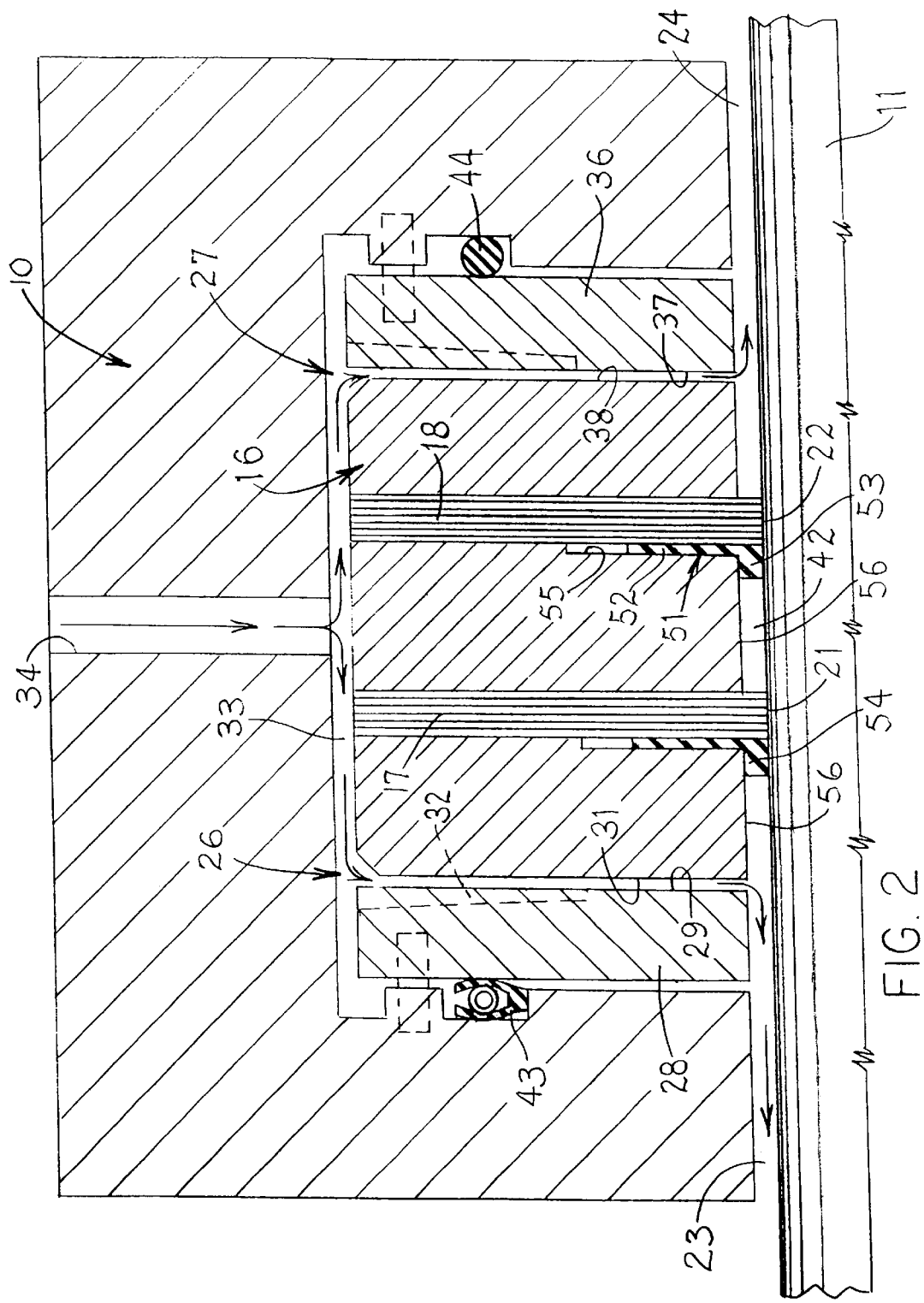
FIG. 2 is a view similar to FIG. 1 but illustrates a variation of the seal arrangement.

Referring now to FIG. 2, there is illustrated a further improvement with respect to a seal arrangement. The seal arrangement of FIG. 2 generally corresponds to the seal arrangement of FIG. 1, except that the buffer fluid passage 41 in the rotor has been eliminated, and thus corresponding reference numerals are utilized in FIG. 2 to designate the same parts as described above with respect to FIG. 1, whereby further description of these same parts in FIG. 2 is believed unnecessary.

The seal arrangement illustrated by FIG. 2 additionally incorporates a gasket 51 which is preferably positioned axially between the brushes 17 and 18 so as to create an additional sealing relationship within the annular region 42 defined between the rotor 16 and the shaft 11. The gasket 51 is preferably constructed of a conventional elastomeric material of the type utilized in the sealing industry, and in the illustrated construction includes an outer annular platelike mounting part 52 which projects radially outwardly and is clampingly engaged axially between a radially extending back wall 55 defined on the rotor and the side of the annular brush 18. The outer annular mounting part 52 terminates at an inner enlarged annular ring part 53 which is disposed generally within the annular region 42 so as to sealingly engage the inner annular wall 56 of the rotor and the periphery of the shaft 11. This enlarged annular ring part 53 of the gasket in effect creates a further barrier which extends across the radially inner portions of the brush bristles which project radially inwardly of the rotor so as to further restrict the migrating of process fluid axially between the bristles of the brush member. The gasket 51 is desirably positioned closely adjacent the brush so that any small movement of the brush or rotor relative to the shaft will cause the gasket to move with the brush, thereby minimizing the tendency of the gasket to adhere to the shaft and thus preserving the desired ability of the shaft to have at least limited axial movability relative to the brush members.

The seal arrangement illustrated by FIG. 1 also has a further gasket 54 associated with and mounted on the rotor 16 just upstream of the other brush member 17. If use of only a single gasket is preferred, however, then the gasket 54 can be eliminated.

It will be appreciated that gaskets having different geometric shapes or configurations can also be utilized. For example, a conventional elastomeric seal ring, such as an O-ring, can be utilized if desired, although a platelike gasket as illustrated by gasket 51 is believed to provide preferred performance, In addition, the arrangement illustrated by FIG. 1 can provide a single annular brush member associated with the rotor, such as solely the brush member 18, and in such instance the latter brush member would again preferably be provided with a gasket associated therewith, such as the gasket 51, with the latter preferably being provided on the side of the gasket exposed to the process fluid.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A brush seal arrangement for sealing cooperation between a shaft and a surrounding member which is relatively rotatable with respect to the shaft, said brush seal comprising an annular rotor disposed in surrounding relationship to the shaft and being sealed with respect to the housing, the rotor mounting thereon first and second annular brush members which are disposed in axially spaced relation and which have annular edge portions which create a frictional and sealing engagement with the shaft to nonrotatably and sealingly couple the rotor to the shaft, a passage extending through the rotor for communication with an annular region defined between the annular brush members in surrounding relationship to the shaft, and a pressurized buffer gas supplied through the passage into the annular region.

2. A seal arrangement according to claim 1, including a first noncontacting face seal cooperating between said housing and one end of said rotor, said first face seal having one annular edge communicating with an intermediate chamber containing the pressurized buffer gas and the other annular edge communicating with a process fluid upstream of the brush members.

3. A seal arrangement according to claim 2, including a second face seal cooperating between said housing and the other axial end of said rotor and creating a noncontacting face seal therebetween, said second face seal having one annular edge which communicates with the intermediate chamber and at the other annular edge communicates with a low pressure zone.

4. A seal arrangement according to claim 3, wherein a spring-energized elastomeric seal arrangement cooperates axially between the housing and a rear side of the first face seal for urging the first face seal axially toward the rotor.

5. A hybrid seal arrangement for creating a sealed relationship between a shaft and a surrounding member which is rotatable relative to the shaft, the seal arrangement comprising a rotor which surrounds the shaft within the surrounding member and is substantially nonrotatable relative to the shaft, a first nonrotatable seal ring surrounding the shaft and nonrotatably secured relative to the surrounding member and disposed in axially opposed relationship to one axial end of said rotor for creating a first noncontacting face seal therebetween, a second nonrotatable sealing ring surrounding the shaft and nonrotatably connected to the surrounding member and disposed in axially opposed relationship with respect to the other axial end of said rotor to define a second noncontacting face seal therebetween, said rotor mounting thereon an annular brush member defined by a plurality of bristles which project radially with respect to the shaft and which have terminal ends which project beyond the rotor and create a frictional and sealing contact with the shaft over an annular area therewith to both sealingly and nonrotatably couple the rotor to the shaft, and an annular elastomeric gasket member mounted on the rotor in axially close proximity to the brush member on a side thereof which communicates with a process fluid, said annular gasket member radially overlapping the projecting ends of the brush bristles which contact the shaft so as to minimize migration of process fluid past the brush bristles.

6. A seal arrangement according to claim 5, wherein the annular gasket member includes an annular platelike gasket part which projects radially and is axially clamped between the annular brush member and an opposed axial face on the rotor, the annular platelike part of the gasket terminating radially in an enlarged annular gasket part which radially overlaps the terminal ends of the bristles which project outwardly of the rotor.

7. A seal arrangement according to claim 5, wherein the rotor has a pair of said annular brush members mounted therein in axially spaced relation for sealingly contacting the shaft at a pair of axially spaced annular areas, and said gasket member being positioned axially between said pair of brush members.

* * * * *